May 24, 1955 F. P. PLOTKIN 2,709,114
WIRE WHEEL COVER
Filed Jan. 27, 1953 2 Sheets-Sheet 2
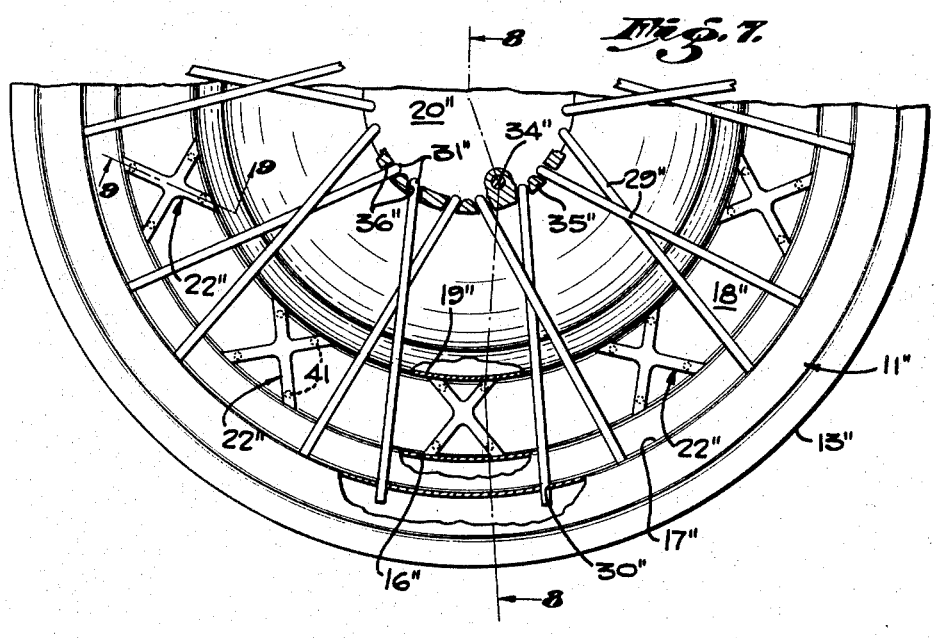
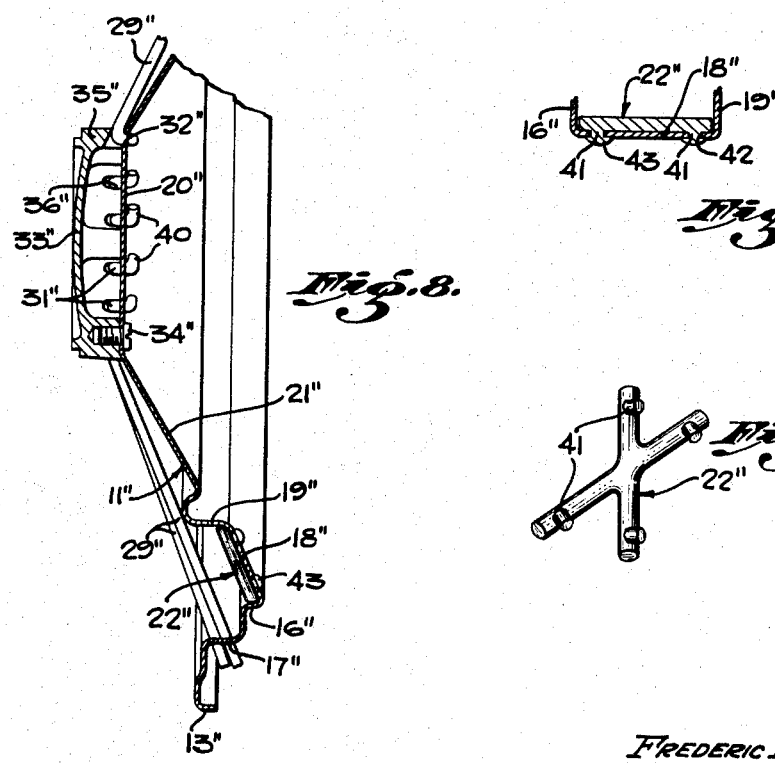
INVENTOR.
FREDERIC P. PLOTKIN,
BY
Robert M. McManigal
ATTORNEY United States Patent Office 2,709,114
Patented May 24, 1955

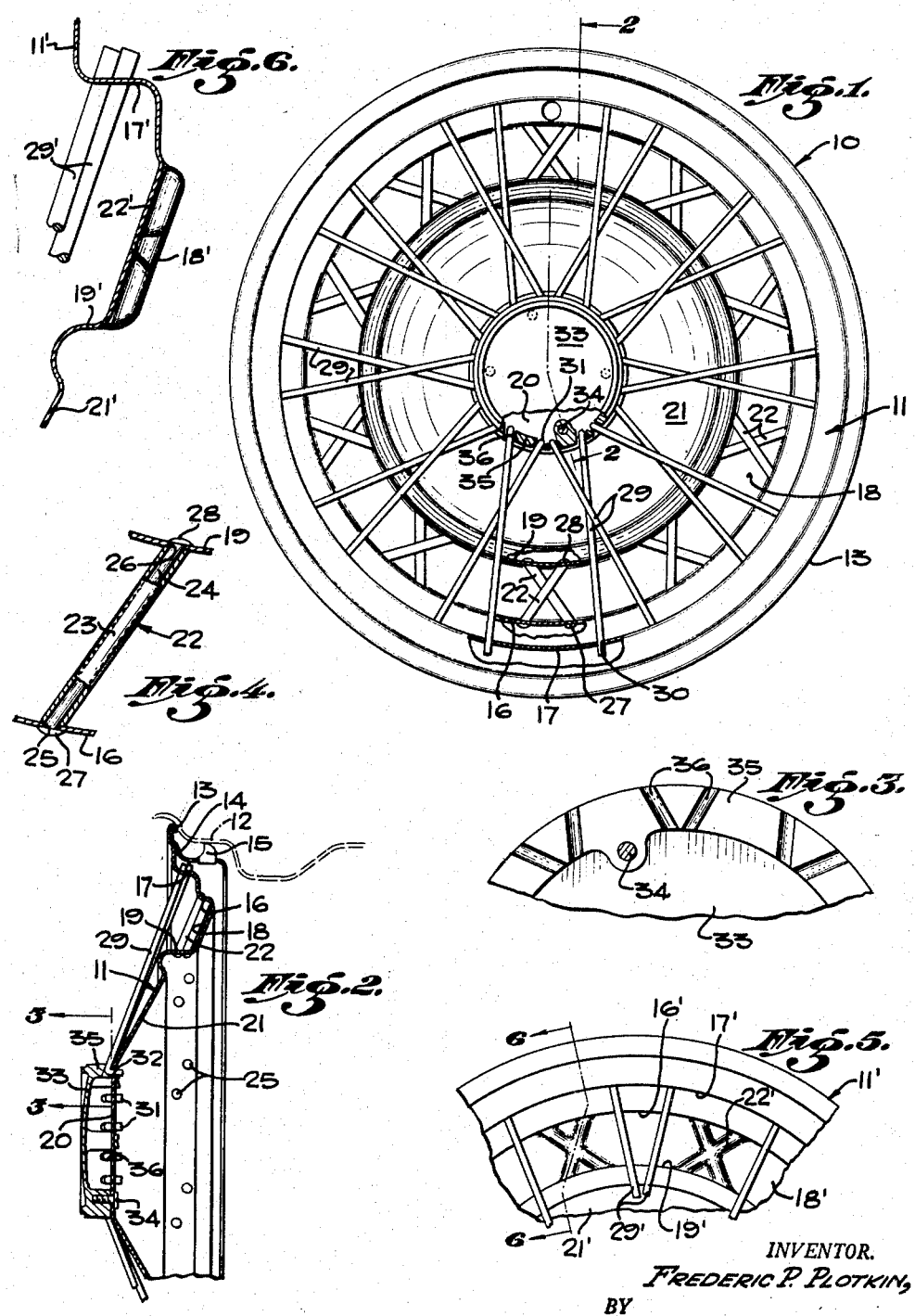

2,709,114
WIRE WHEEL COVER
Frederic P. Plotkin, Los Angeles, Calif.

Application January 27, 1953, Serial No. 333,426

6 Claims. (Cl. 301—37)

The present invention relates to a wheel cover and more particularly to a light weight ornamental wheel covering device that is adapted to simulate spoke or wire type wheels when utilized in conjunction with and secured to a vehicle wheel rim.

With the advent of many new foreign and domestic sports vehicles, a considerable demand has arisen for spoke or wire type wheels. Such wheels add to the appearance of the vehicle and enhance the value thereof. In most cases, however, contemporary vehicles have been made with solid type rims and wheels and, from an economic standpoint, a change over to wire type wheels would be too expensive for the average vehicle owner. To overcome this economic disadvantage, the present invention contemplates the provision of wheel cover devices that may be secured to vehicle wheel rims of the solid type, and accurately simulate the more expensive spoke type wheel.

In devices of this character, it is also necessary that they be constructed in such a manner as to make for easy and rapid assembly, rigidity and ruggedness in construction, while still providing the ornamental appearance of spoke wheels.

Accordingly, it is an object of the present invention to provide a novel wheel cover of the class described.

Another object of the invention is to provide a novel means for retaining the spokes in a wire wheel simulating wheel cover.

A further object of the invention is to provide a novel wheel cover that is rugged in construction, relatively simple in design, easy to assemble and manufacture, while still being pleasantly ornamental in appearance, the construction being such as to eliminate the possibility of rattling or other associated sounds.

A still further object of the invention is to provide a novel means for simulating the appearance of spokes in a wheel cover of the class described.

My invention has many other objects, advantages, and features, some of which, with the foregoing, will be set forth in the following description in which I will describe certain embodiments of my invention which I have selected for illustrative purposes only in the drawing accompanying and forming a part of the present specification.

Fig. 1 is an elevational view, partially in section, of the wheel cover of the present invention;

Fig. 2 is a fragmentary sectional view taken substantially as indicated by line 2—2, Fig. 1;

Fig. 3 is an enlarged, fragmentary sectional view of a portion of the hub cap and taken substantially as indicated by line 3—3, Fig. 2;

Fig. 4 is a fragmentary, enlarged, detail sectional view of one of the primary spoke members;

Fig. 5 is a fragmentary view showing a modified form of primary spoke members;

Fig. 6 is an enlarged, fragmentary, sectional view of the modification of Fig. 5 and taken substantially as indicated by line 6—6, Fig. 5;

Fig. 7 is a fragmentary enlarged elevation view similar to Fig. 1, and showing a further modified form of the invention;

Fig. 8 is a fragmentary sectional view taken substantially as indicated by line 8—8, Fig. 7;

Fig. 9 is a detail sectional view taken substantially as indicated by line 9—9, Fig. 7 and showing a modified form of primary spokes; and Fig. 10 is a detail perspective view of the modified primary spoke meanse of Figs. 7 and 9.

Referring to the drawing by reference characters, the wheel cover of the present invention is shown as indicated generally at 10. As shown, the cover includes an integral combination rim and hub member 11, this member being of an overall diameter sufficient to cover the area within the rim of a vehicle wheel, this rim being indicated as at 12, by the dotted lines in Fig. 2. Any suitable means may be provided to secure the member 11 to the wheel rim 12. For example, the outer periphery of the member 11 may be formed with a bead 13 to secure and retain an adapter ring 14 thereto. The adapter ring 14 may be provided with spring type detents 15, which are in turn adapted to engage an axially extending portion of the vehicle wheel rim and thereby firmly secure the wheel cover thereto.

The member 11 includes a pair of radially and axially spaced, axially extending and inwardly directed portions 16 and 17, which form one side of an annular groove 18. The other side of the groove 18 is formed by means of an axially extending, outwardly directed, radial portion 19. A hub portion 20 is formed in the central area of the member 11, this portion being integrally connected to the groove 18 by means of a substantially conical portion 21.

A plurality of primary spokes 22 are arranged in crossed pairs intermediate the portion 16 and the portion 19. As shown in detail in Fig. 4, each of these primary spokes include tubular members 23 through which an elongated rivet 24 is arranged, the rivet being adapted to extend through openings 25 and 26 in the portions 16 and 19 and to be headed over as at 27 and 28.

A plurality of secondary spokes 29 are arranged in crossed pairs intermediate the portion 17 and the hub 20. As shown in Fig. 1, the outer ends of the spokes 29 are positioned in and adapted to extend through a plurality of circumferentially and axially spaced openings 30 in the portion 17. The inner ends of the spokes 29 are provided with axially extending hook portions 31 which are adapted to be received in circumferentially spaced, axially extending openings 32 in the hub portion 20.

A hub cap 33 is adapted to be secured, as by screws 34, to the hub portion 20. As shown in Fig. 3, the cap 33 has a peripheral flange 35 in which are formed a plurality of substantially radially extending grooves 36, these grooves being adapted to receive the inner ends of the spokes 29. It may be seen that when the cap 33 is secured in place by means of the screws 34, the inner ends of the spokes 29 will be retained in the grooves 36 and moved to radial in-line positions contrary to the arrangement of the outer ends thereof in the axially and circumferentially spaced openings 30. Inasmuch as the spokes 29 are crossed in installation, this forced alignment of the inner ends thereof will cause a bending force about each other to be applied thereto, thereby causing a binding action of the outer ends in the openings 30 and securely retaining these spokes at each end thereof to prevent undesirable loosening or inadvertent removal.

It may thus be seen that the wheel cover thus arranged and assembled is consequently rigid in construction, relatively easy to assemble in manufacture, while still being pleasantly ornamental in design and accurately simulating a wire or spoke type wheel.

In Figs. 5 and 6 a modification of the invention is shown wherein like parts are indicated by single primed reference numerals. As shown, this modification contemplates the provision of primary spokes 22' as being formed integrally from the base of the groove 18'. This modified form of construction would simulate the appearance of the primary spokes without the expense and necessity for the actual insertion of independent members to thereby produce a unit that is acceptable in less expensive applications.

In Figs. 7 through 10, I show a further modification of the invention wherein like parts are indicated by double primed reference numerals. As shown primarily in Figs. 7 and 8, the secondary spokes 29" are secured in position in the openings 30" formed in the portion 17" in much the same manner as previously described. In this modification, the inner ends 31" of the secondary spokes are adapted to be inserted through openings 32" in the portion 20", and are further adapted to be bent over as at 40 to thereby secure these spokes in place and to insure the application of the bending force to the secondary spokes to thereby further secure them in position and hold them against movement that may cause rattling or other undesirable noise. The cap 33" with inwardly directed flange 35" as secured in place as by the screws 34", suitable notches 36" encasing the inner ends of the secondary spokes to cover the same and to provide an ornamental appearance.

The primary spokes, indicated generally at 22", are formed integrally in a substantially X-shape as by die casting or the like. These spokes are adapted to lie against the surface 18" and have a plurality of bosses 41 formed thereon. The bosses 41 are adapted to extend through suitable openings 42 and be riveted over as at 43 to thus present a primary spoke means simulating actual spokes.

From the foregoing description, the uses, advantages, and operation of my invention will be readily understood by those skilled in the art to which the invention appertains. While I have described certain embodiments of my invention, I desire to emphasize the fact that the invention may be applied to various types of wheel covers, to have it understood that the examples given are merely illustrative, and that the invention is not to be limited to the details disclosed herein, but is to be accorded the full scope of the appended claims.

I claim:

1. A wheel cover comprising a combination ring and hub member, a plurality of circumferentially spaced, generally radially extending openings in the rim portion of said member, a plurality of circumferentially spaced generally axially extending openings in the hub portion of said member, a plurality of pairs of crossed spokes, the spokes of each pair being in engagement intermediate their ends and being slightly resiliently bent about each other, the outer ends of the spokes of each pair being positioned in said generally radially extending openings in the rim portion of said member, the inner ends of the spokes of each pair being provided with hook portions positioned in said generally axially extending openings in the hub portion of said member, and means retaining the hook portions of said spokes in the openings in said hub portions to maintain the slightly resiliently bent condition of each pair of crossed spokes.

2. A wheel cover as described in claim 1 in which said means for retaining the hook portions of said spokes in the openings in said hub portion comprises a hub cap secured to said hub portion with the inner portions of said spokes being clamped between said hub cap and said hub portion.

3. A wheel cover as described in claim 1 in which said means for retaining said hook portions of said spokes in the openings in said hub portions comprises lateral offsets on the ends of said hook portions to prevent axial movement of said hook portions from said openings in said hub portion.

4. A wheel cover comprising a combination ring and hub member, an inwardly directed shoulder on the ring portion of said member, a plurality of circumferentially spaced openings in said inwardly directed shoulder, a plurality of circumferentially spaced openings in the hub portion of said member, a plurality of pairs of crossed spokes, the outer ends of the spokes of each pair being positioned in said openings in said inwardly directed shoulder, the inner ends of the spokes of each pair being positioned in said openings in said hub portion, the spokes of each crossed pair being in engagement with each other intermediate their ends and being slightly resiliently bent about each other, and means retaining the inner ends of said spokes in said openings in said hub portion to maintain such engagement of intermediate portions of the spokes and to maintain the slightly bent condition of each pair of crossed spokes.

5. A wheel cover comprising a ring portion and a hub portion, an inwardly directed shoulder on said ring portion, a plurality of circumferentially spaced openings in said inwardly directed shoulder, a plurality of circumferentially spaced openings in the hub portion of said member, a plurality of pairs of crossed spokes, the outer ends of the spokes of each pair being positioned in said openings in said inwardly directed shoulder, the inner ends of the spokes of each pair being positioned in said openings in said hub portion, the spokes of each crossed pair being in engagement with each other intermediate their ends and being slightly resiliently bent about each other, and means retaining the ends of said spokes in said openings to maintain such engagement and to maintain the slightly bent condition of each pair of crossed spokes.

6. A wheel cover comprising a ring portion and a hub portion, a plurality of circumferentially spaced openings in said rim portion, a plurality of circumferentially spaced openings in said hub portion, a plurality of pairs of crossed spokes, the spokes of each pair being in engagement intermediate their ends and being slightly resiliently bent about each other, the outer ends of the spokes of each pair being positioned in said openings in said rim portion, the inner ends of the spokes of each pair being positioned in said openings in said hub portion, and means retaining the ends of said spokes in said openings to maintain the slightly resiliently bent condition of each pair of crossed spokes.

References Cited in the file of this patent

UNITED STATES PATENTS

| Number | Name | Date |
|---|---|---|
| D. 169,514 | McLeod | May 5, 1953 |
| 742,503 | Seeds | Oct. 27, 1903 |
| 1,799,712 | Wagenhorst | Apr. 7, 1931 |
| 1,950,082 | Farr | Mar. 6, 1934 |
| 2,069,952 | Hoffman | Feb. 9, 1937 |
| 2,433,854 | Lyon | Jan. 6, 1948 |

OTHER REFERENCES

| Number | Country | Date |
|---|---|---|
| 714,587 | France | Sept. 7, 1931 |